United States Patent
Tran et al.

(10) Patent No.: US 11,003,697 B2
(45) Date of Patent: May 11, 2021

(54) CLUSTER COMPUTING SYSTEM AND METHOD FOR AUTOMATICALLY GENERATING EXTRACTION PATTERNS FROM OPERATIONAL LOGS

(71) Applicant: HO CHI MINH CITY UNIVERSITY OF TECHNOLOGY (HUTECH), Ho Chi Minh (VN)

(72) Inventors: Khanh Duc Tran, Ho Chi Minh (VN); Nghia Van Bui, Ho Chi Minh (VN)

(73) Assignee: HO CHI MINH CITY UNIVERSITY OF TECHNOLOGY (HUTECH), Ho Chi Minh (VN)

( * ) Notice: Subject to any disclaimer, the term of this patent is extended or adjusted under 35 U.S.C. 154(b) by 0 days.

(21) Appl. No.: 16/184,947

(22) Filed: Nov. 8, 2018

(65) Prior Publication Data
US 2020/0364251 A1 Nov. 19, 2020

(51) Int. Cl.
*G06F 7/00* (2006.01)
*G06F 16/00* (2019.01)
*G06F 16/33* (2019.01)
*G06F 16/332* (2019.01)
*G06F 16/901* (2019.01)
*G06F 16/17* (2019.01)
*G06F 16/35* (2019.01)

(52) U.S. Cl.
CPC ...... *G06F 16/3334* (2019.01); *G06F 16/1734* (2019.01); *G06F 16/3329* (2019.01); *G06F 16/355* (2019.01); *G06F 16/9017* (2019.01)

(58) Field of Classification Search
None
See application file for complete search history.

(56) References Cited

U.S. PATENT DOCUMENTS

| | | | |
|---|---|---|---|
| 2006/0200708 A1* | 9/2006 | Gentieu | H04L 1/243 714/704 |
| 2007/0091357 A1* | 4/2007 | Konno | G06F 16/48 358/1.15 |
| 2013/0091266 A1* | 4/2013 | Bhave | G06F 16/90344 709/224 |
| 2015/0309984 A1* | 10/2015 | Bradford | G06F 40/263 704/8 |
| 2016/0196174 A1* | 7/2016 | Jacob | G06F 11/0781 714/37 |
| 2016/0217133 A1* | 7/2016 | Reiter | G08B 5/22 |
| 2017/0220651 A1* | 8/2017 | Mathew | G06F 16/248 |
| 2018/0307576 A1* | 10/2018 | Debnath | G06F 11/0775 |

(Continued)

*Primary Examiner* — Tuan A Pham (57) ABSTRACT

A process for generating regular expressions (regexes) as extraction patterns in a cluster computing system includes: receiving log events, a set of seed words, and a set of seed patterns; determining whether the set of seed words is full; if not, generating a new patterns by iteratively adding new patterns whose pattern scores $S_1$ surpass a first preset score into the set of seed patterns; selecting a subset of seed patterns from the set of seed patterns; determining whether the subset of seed patterns is empty if not, generating a subset of seed words whose word scores $S_2$ surpass a second preset score and iteratively adding the subset of seed words into the set of seed words; and repeating the above steps until the set of seed patterns is full and the set of seed words is empty; and finally pruning the set of seed patterns.

16 Claims, 6 Drawing Sheets

(56) References Cited

U.S. PATENT DOCUMENTS

2018/0309648 A1* 10/2018 Debnath .................. H04W 4/38
2018/0314744 A1* 11/2018 Mathew ..................... G06F 9/50
2018/0314853 A1* 11/2018 Oliner ................. G06F 16/2477

* cited by examiner

CLUSTER COMPUTING SYSTEM AND METHOD FOR AUTOMATICALLY GENERATING EXTRACTION PATTERNS FROM OPERATIONAL LOGS

FIELD OF THE INVENTION

The present invention relates generally to the field of machine learning and information extraction. More specifically, the present invention relates to a method for automatically generating regular expressions using parallel processing technique.

BACKGROUND ART

The amount of data generated in the internet today is mind-boggling. 44 billion of gigabytes (GB) of data created per day in 2016. In 2025 this amount of data is increased to 463 billion of GBs per day. If this rate continues, the amount of data accumulated and stored in data centers or log repository or, simply, corpus in cluster computing systems are unimaginable. To sift through the data centers to search for a certain pattern such as IP addresses, email address, port numbers, phone numbers, domain names, relations, bio information, etc. is a daunting task. Therefore, in the machine learning and information extraction, log analysts use regular expressions (abbreviated as regex or regexes) which are a sequence of codes that defines the search pattern. An example of a regex created to extract port numbers of computers in a distributed computer system is: "\w+ \d+ \d+:\d+:\d+ \w+\d+ \w +\[\ d +\]: accepted publickey for \w+ from \d +\.\ d +\.\ d +\.\ d+ port (\d+)". In today distributed computer systems, writing regexes by hand for different types of log repository are impossible. Furthermore, log repositories have different formats because data are stored by different users in cluster computing systems, or distributed computing systems from around the world. Some examples of data sources include syslog format, natural words, and Nagios format. Consequently, the manual task of writing regex codes to search through the log repository is usually accomplished by the machine learning.

To solve the above described problem, the prior-art mutual bootstrapping method is designed to: (1) overcome the tedious manual tasks of writing regexes and (2) to improve the information extraction performance, e.g., accuracy and efficiency. Another objective of the prior-art mutual bootstrapping is to expand the scope of extraction patterns. Mutual bootstrapping method is an algorithm in which a small set of annotated text gradually grows into a set bigger by annotating a larger set of unannoated text, choosing some best annotated texts. This growing trend would be stopped when a certain condition is met. The prior-art mutual bootstrapping uses a tool called AutoSlog to generate a complete set of extraction patterns that extract every noun phrase in an unannotated training text. This process is executed before the bootstrapping begins. The bootstrapping method is aimed to select the best patterns from a global and comprehensive set.

However, the prior-art bootstrapping method cannot handle a large amount of various data formats because this method is designed to deal with natural languages and not with operational logs. Applying the prior-art mutual bootstrapping method to operational logs only yields a diverging set of patterns that degrades its performance. More than often, the same word can appear in different positions in different patterns, which does not mean that those patterns are yielding different words. Thus, for the same keyword in different positions, the prior-arts unnecessarily collect multiple duplicate patterns. Furthermore, without further filtering or pruning steps, prior-art bootstrapping methods produce rather large and inaccurate patterns that do not produce accurate results.

Another problem of the prior-art bootstrapping methods is the determination of which patterns would be selected as input for the process of word extraction. Though these methods try to generate and add only relevant patterns to the set of seed patterns, there is no absolute warranty that the set contains relevant elements. Even the patterns originally provided as seeds still cannot provide that warranty. Thus, what is needed is a method of pattern scoring in order to select some certain most relevant patterns that are used for the extracting of words. At least one of these best patterns must extract at least one new word that does not exist in the current seed set; otherwise it is meaningless for the purpose of expanding the set of seed words. Such a pattern is called a significant pattern. In addition, there exists another problem similar to the previous one: consider the words extracted by the best patterns, again there is no warranty that all of them are relevant. Therefore, a method for scoring words is needed so that only the best ones can be selected to add to the set of seed words.

In the prior-art bootstrapping method, another critical performance problem is the lazy quantifier used in the regex generalized from the prefix. When this quantifier is used, performance is worsened because the lazy quantifier requires backtracking. It is well known that lazy quantifiers will consume every character including colons in the log event. This only stops at the end of the log event where there is nothing more to consume. When the prior-art process reaches the end of the event, the regex engine encounters a failed match. But because the quantifier is lazy, the engine will backtrack by forcing the already consumed characters to be released in a last-in first-out (LIFO) order until a colon is released and thus forming a match. This process is repeated in multiple times until four colons are exactly matched. Imagine when this number is not 4 but dozens or even hundreds, the length of the log event will be significantly larger—that would be a lot of computations.

Therefore, what is needed is a method that automatically generates relevant patterns with minimal human participations for different types of log events.

In addition, what is needed is a method that guarantees the convergence of the collected patterns.

Yet what is needed is a method that is both efficient and fast in computational time.

Furthermore, what is needed is a method that provides patter and word filtering so that relevant patterns are guaranteed.

SUMMARY OF THE INVENTION

Accordingly, an objective of the present invention is to provide a process for generating regular expressions (regexes) as extraction patterns produced within a cluster computing system is disclosed which includes: receiving log events, a set of seed words, and a set of seed patterns; determining whether the set of seed patterns is full; if the set of seed patterns is not full, then generating a new set of seed patterns by iteratively adding the set of seed patterns; selecting a subset of seed words from the set of seed words; determining whether the subset of seed words is empty; if the subset of seed words is not empty, then generating a subset of seed words and iteratively adding the subset of seed words into the set of seed words; and repeating the steps of determining whether the set of seed patterns is full and set of seed words until the set of seed patterns is full and the set of seed words is empty, then pruning the set of seed patterns.

Another objective of the present invention is to provide a cluser computing system that includes: a plurality of independent computers connected together through a high-speed network so as the plurality of independent computers is capable of operating in parallel manner as a single computer; each independent computer including a central processing unit (CPU) with multi-cores and multi-threads; a data storage, wherein the data storage is divided into a plurality of blocks, each block comprising log events; a software program stored in a non-transitory memory media, the software program is executed by the CPUs to perform parallel operations in generating a set of extraction patterns for each of the plurality of blocks; and storing the set of extractions patterns in a cache memory; comparing the sets of extraction patterns from the cache memory; if the sets of extraction patterns from the cache memory are the same then use the set of extraction patterns; otherwise continuing performing the operations to generate the set of extractions patterns, wherein the operations to generate regular expressions (regexes) as extraction patterns in each of the log events; receiving the log events, a set of seed words, and a set of seed patterns from each of the plurality of blocks; determining whether the set of seed patterns is full; if the set of seed patterns is not full, then generating a new set of seed patterns by iteratively adding the set of seed patterns; selecting a subset of seed words from the set of seed words; determining whether the subset of seed words is empty; if the subset of seed words is not naught (empty), then generating a subset of seed words and iteratively adding the subset of seed words into the set of seed words; and repeating the steps of determining whether the set of seed patterns is full and set of seed words is empty until the of seed patterns is full and the set of seed words is empty, then pruning the set of seed patterns.

Yet another objective of the present invention is to provide a computer-implemented software application (or an API) for generating regular expressions (regexes) as extraction patterns for a computer network are disclosed which includes: receiving log events, a set of seed words, and a set of seed patterns; determining whether the set of seed patterns is full; if the set of seed patterns is not full, then generating a new set of seed patterns by iteratively adding the set of seed patterns; selecting a subset of seed words from the set of seed words; determining whether the subset of seed words is empty; if the subset of seed words is not empty, then generating a subset of seed words and iteratively adding the subset of seed words into the set of seed words; and repeating the steps of determining whether the set of seed patterns is full and set of seed words until the set of seed patterns is full and the set of seed words is empty, then pruning the set of seed patterns.

Another objective of the present invention is to provide a method that automatically generates relevant patterns with no human participations for different types and formats of log events.

Another objective of the present invention is to provide a method that guarantees the convergence of the collected patterns.

Another objective of the present invention is to provide a method that is efficient and abridged in regex computational time.

Furthermore, another objective of the present invention is to provide a method that provides pattern and word filtering so that relevant patterns are guaranteed.

Furthermore, another objective of the present invention is to provide a method capable of providing the most relevant regexes which are executed as the bootstrappings progress;

Another objective of the present invention is to provide a method that uses of pattern pruning to remove irrelevant results;

Another objective of the present invention is to provide a software-implemented method that uses parallel processing and relation caching processes in a cluster computing system to improve its regex computational times.

Yet another objective of the present invention is to provide a software-implemented method that uses parallel processing and relation caching processes in a central processing unit (CPU) equipped with multi-cores and multi-threads to improve its regex computational times.

These and other advantages of the present invention will no doubt become obvious to those of ordinary skill in the art after having read the following detailed description of the exemplary embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the exemplary embodiments of the invention, examples of which are illustrated in the accompanying drawings. While the invention will be described in conjunction with the exemplary embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
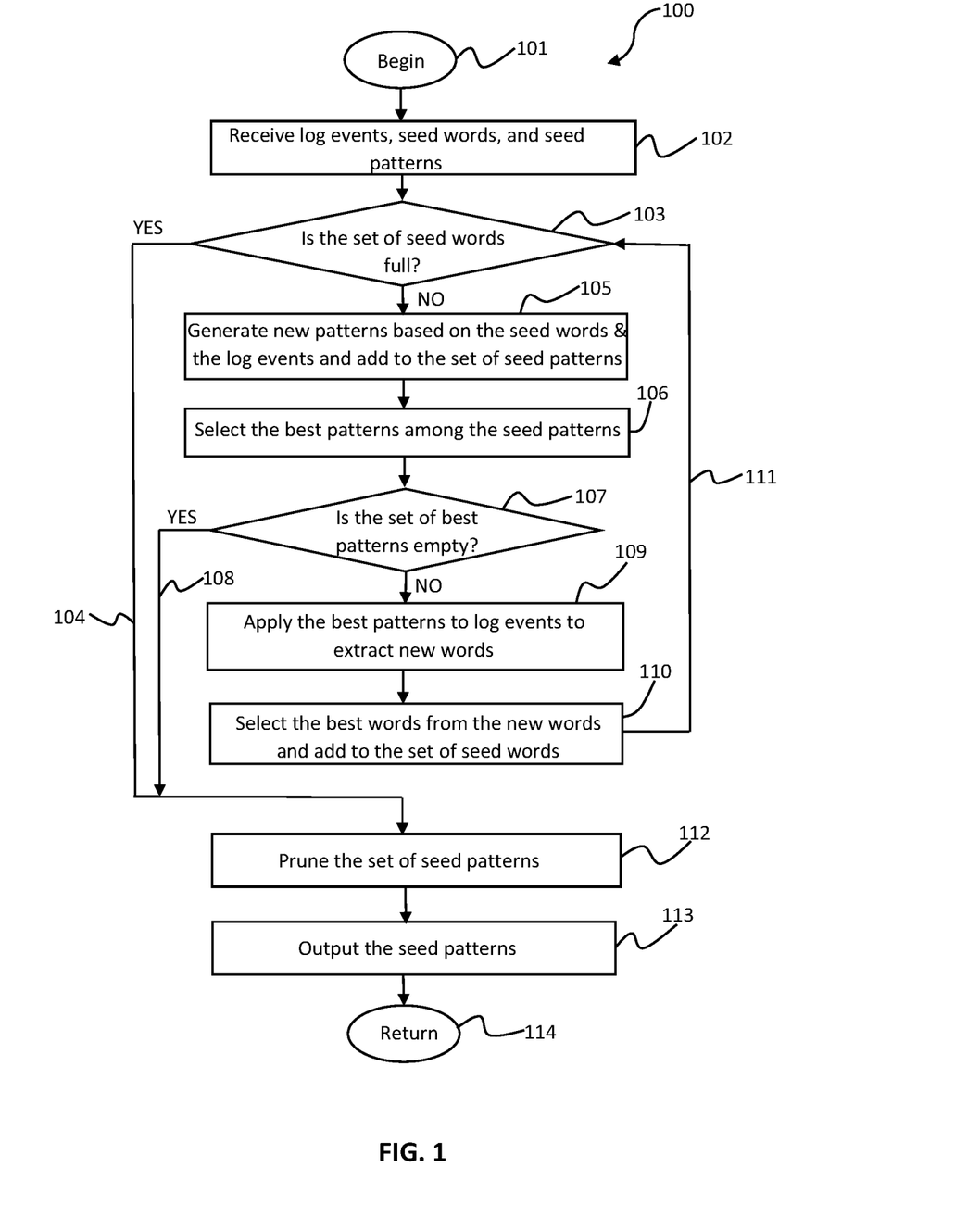
FIG. 1 is a flow chart representing a bootstrapping method of generating extraction patterns in accordance with an exemplary embodiment of the present invention.

Many aspects of the present invention are now described with reference to FIG. 1-FIG. 6. Now, FIG. 1 illustrates a flow chart of a method 100 of generating a set of seed patterns in accordance with an exemplary embodiment of the present invention.

At step 101, method 100 begins. That is when the generation process begins.

At step 102, log events and corresponding set of seed words and a set of seed patterns are received. Log events are data information generated in a computer network and stored in a repository of a cluster computing system. It will be understood that log events can also be generated and stored in a memory of a computer having a CPU with multi-cores and multi-threads capable of handling method 100 in a parallel processing. Log events may include people, organizations, location, port numbers, IP addresses, time, date, prices, etc. . . . A set of seed words are key words contained in log events that are used to generate patterns, and to figure out larger events so that people and machine can understand. A set of seed patterns are also known as extraction patterns which are used to select relevant patterns from a zillion of log events.

Continuing with step 102, an illustrative and non-limiting example is provided. The following six log events are received in chronological order: (1) Mar 10 16,49,29 mcdavid su(pam_unix)[9596]: session opened for user root by (uid=500); (2) Mar 10 16,50,01 mcdavid crond(pam_unix) [9638]: session opened for user root by (uid=0); (3) Mar 10 16,50,01 mcdavid hello(pam_unix)[9638]: session opened for user root by (uid=0); (4) Mar 10 16,56,32 mcdavid ntpd(2544): synchronized to 138.23.180.126, stratum 2; (5) Mar 10 16,56,32 mcdavid su[2544]: synchronized to 138.23.180.126, stratum 2; (6) Mar 10 16,56,32 mcdavid crond[2544]: synchronized to 138.23.180.126, stratum 2. There are three seed words in the above log event. They are "crond", "hello", and "su". The set of seed patterns is empty.

At step 103, whether the set of seed words is full is determined. Step 103 will be described in details in later figures. In one implementation of the present invention, a set of seed words is considered to be full when its size or the number of elements reaches a predetermined number. That means the category of the log events has been fully learned. In one exemplary implementation of step 103, this predetermined number equals to the average number of seed words obtained per an iteration round (W) times the average total number of iterations (i). Experimentally, this predetermined number is 50. However, a predefined number of any positive integer number is within the scope of the present invention. From the above example, in the first iteration, the set of seed words is empty and thus it is not full. In another implementation of step 103, the set of seed words is full when its score is below a threshold score. That means, the newly collected seed words are all bad.

At step 104, if the set of seed words is full, go to step 112 discussed below. Since the set of seed words is not full in the first iteration, process 100 goes to the next step 105.

At step 105, if the set of seed words is not full, then use seed words to generate a new set of seed patterns by iteratively adding the new set of seed patterns into the old set of seed patterns. In many aspects of the present invention, a larger set of seed patterns is desired in order to figure out or to select a pattern of a larger event that human and machine can intelligently understand. In the above illustrative example, two new patterns are generated: (1) /\(?:[/\,]*,){2}\d+ \w+ (\w+)\(; and (2) /\(?:[/\,]*,){2}\d+ \w+ (\w+)\[.

At step 106, the best patterns are selected among the set of seed patterns. In some aspects of the present invention, the best patterns are selected by scoring the set of seed patterns and then only a certain number M of top scored seed patterns are selected. The manner the best patterns are selected will be described in more details later. As alluded before in step 103, the best pattern can be selected by its score. The best pattern with an overall score of at least 1 are selected. A pattern of a score 1.19 is selected from the above example: Selecting best patterns among 2 patterns. One best pattern with overall score of 1.19 which is identified as /\(?:[/\,]*,){2}\d+ \w+ (\w+)\(.

At step 107, whether the set of best patterns is empty is determined. In one exemplary embodiment of the present invention, the set of best patterns is determined whether it contains no element. This means if there exists no set of seed patterns which achieves above the threshold score, then the set of best patterns is determined to be empty. Obviously, because there is one best pattern in the example above, the answer to step 106 is NO and it proceeds to the next step.

At step 108, if the set of seed patterns is empty, then method 100 goes to step 112 which is to further prune the set of seed patterns. In the first iteration of the bootstrapping, the set of seed pattern is not empty, process 100 goes to step 109.

At step 109, if the set of new patterns exists, then the set of seed patterns is iteratively added to form a larger set of seed patterns and to select new seed words. By performing step 109, a new word is extracted which is "ntpd".

At step 110, the set of new seed words is further selected to find best words. Then these best words are added back to the set of seed words. The criteria to select the best new seed words are described herein: each seed word is scored by the formula $$\text{score(word)} = \frac{\sum_{i=1}^{P} \log_2(F_i + 1)}{P},$$

wherein P is the total number of patterns that extract that word and $F_i$ is the frequency of the $i^{th}$ pattern. Then, words that have scores above a predetermined threshold will be selected. With step 110, the new word, "ntpd" obtains a score of 2.0 and it is the best word.

At step 111, steps 103 to step 110 are iteratively repeated to determine whether the new larger set of seed words is full, or all used up. Step 103 to step 109 are iteratively repeated for the above example until no best patterns and all best seed words are used, then method 100 goes to the next step.

Continuing with step 111, in the second iteration loop. At step 103, is the set of seed words full? The answer is NO. At step 105, no new patterns is generated. At step 106, selecting best patterns among 2 patterns: 0 best pattern results. At step 107, the set of best patterns is now empty and the bootstrapping ends.

Next at step 112, the set of seed patterns is pruned. In many aspects of the present invention, only the new set of seed patterns are pruned by continually scoring the new set of seed patterns. As steps 103-109 are performed, the new set of seed patterns are being scored and selected. Step 111 is described in details in later figures. From the above example, after the second iterative loop, zero old pattern and two new patterns are pruned.

At step 113, after being pruned, the set of seed patterns are output and stored for later use. Finally, one new pattern is learned with an overall score of 2.00. The new pattern is: /\(?:[/\,]*,){2}\d+ \w+ (\w+)\(.

Finally, at step 114, method 100 returns to the beginning to select the new seed patterns as new log events come in.

As seen, method 100 of the present invention includes steps of selecting best seed patterns, best seed words, and further pruning the set of seed patterns that improve the performance as well as achieve the convergence of set of seed patterns.

Figure 2:
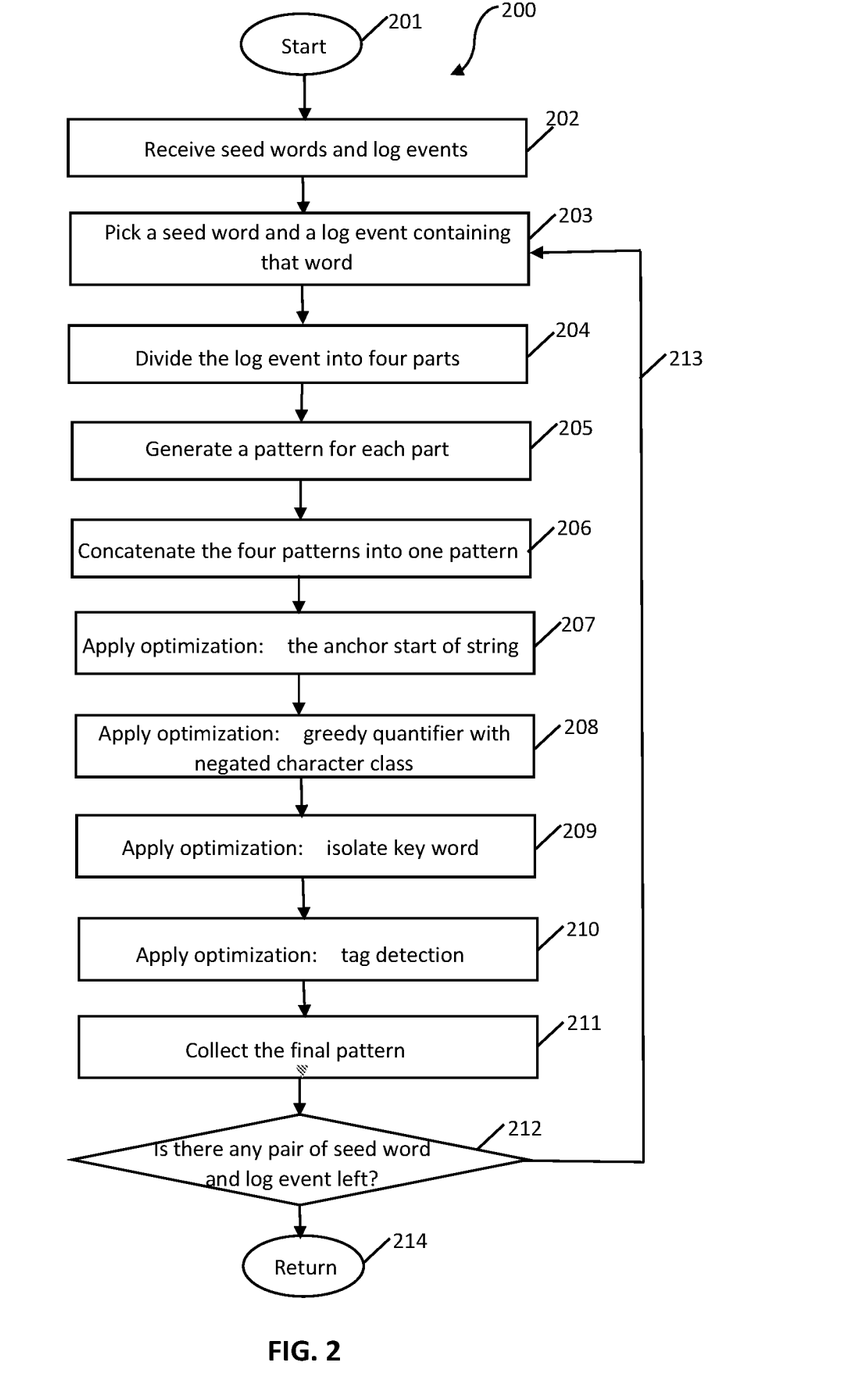
FIG. 2 is a flowchart illustrating a method of generating new extraction patterns in accordance with an exemplary embodiment of the present invention.

Now referring to FIG. 2, a flowchart illustrating a method 200 for generating the new regex patterns in accordance with an exemplary embodiment of the present invention is selected. Method 200 is an exemplary embodiment of step 105 of the present invention.

At step 201, method 200 begins.

At step 202, log events and a set of seed words are received. Step 202 is similar to step 102 above. As an illustrative non-limiting example, three logs events are received: (1) Mar 10 16,49,29 mcdavid su(pam_unix)[9596]: session opened for user root by (uid=500); (2) Mar 10 16,50,01 mcdavid crond(pam_unix)[9638]: session opened for user root by (uid=0); (3) Mar 10 16,50,01 mcdavid hello(pam_unix)[9638]: session opened for user root by (uid=0).

At step 203, a seed word and a log event that contains that seed word are selected. Non-limiting examples of step 203 includes seed word of port numbers 39039 from syslogs is extracted from a log event: "May 18 04:59:58 server26 sshd [17560]: Accepted publickey for fuser from 192.168.174.10 port 39039." Another seed word 34449 is selected from the log event, "May 18 05:00:02 server24 sshd [20566]: Accepted publickey for fuser from 192.168.174.10 port 34449." In the illustrative example above, the seed word, "crond" is extracted and the corresponding log event is: "Mar 10 16, 50, 01 mcdavid crond (pam_unix)[9638]: session opened for user root by (uid=0)".

At step 204, each log event is divided into a plurality of parts. In an exemplary embodiment of the present invention, each log event (with seed word) is divided into four parts which include a prefix, a post-prefix, keyword, and a suffix. A prefix begins from the start of a string (of log event) and ends at the last punctuation before the keyword. A post-prefix contains only letters and no punctuation. A keyword is a seed work. A suffix is the remainder of the string. In the above example, applying step to the log event in step 203 which is divided into 4 parts: Prefix: Mar 10 16, 50; Post-prefix: 01 mcdavid; Keyword: crond; Suffix: (.

Then at step 205, a pattern is generated for each part. In the non-limiting exemplary prefix, post-prefix, keyword, and suffix, four new patterns corresponding to four parts of the log event (string) are generated. More particularly, the first new patterns contain the prefix, the second new patterns contain the post-prefix, the third new patterns contain the key word, and the fourth new patterns contain the suffix. Step 205 is performed, the following patterns are received. Prefix: (?:.*?,){2}; Post-prefix: \d+ \w+; Keyword: (\w+); Suffix: \(.

At step 206, the newly generated patterns are concatenated into one pattern. The following concatenated regex pattern is obtained. (?:.*?,){2}\d+ \w+ (\w+)\(. The following steps 207-210 will be focusing on optimizing this one pattern.

At step 207, the first optimization process is applied which includes the start of string is set up or anchored. When applying a regex (or seed pattern) to a log event, the matching process must start exactly at the beginning of the event. In one exemplary embodiment of the present invention, the anchor start of string, "/\" is used. It is noted that any other start of strings for different type of log events such as Nagios logs, natural language logs are within the scope of step 207 of this present invention. Applying an exemplary anchor operator "/\" to the above concatenated pattern is: /\(?:.*?,){2}\d+ \w+ (\w+)\(.

At step 208, the second optimization process is applied which includes greedy quantifier with negated character class is used. As alluded before, when lazy quantifier (.*?) is used in the regex generalized from prefix, performance is terrible because lazy quantifier requires backtracking, which results in a significant patterns that entail a lot of computation. In one exemplary embodiment of the present invention, the negated character class, "[/\?:]" is used. Applying step 208 to the above concatenated regex pattern in step 206: /\(?:[/\,]*,){2}\d+ \w+ (\w+)\(. It is noted that any other negated character class symbols are within the scope of this present invention.

At step 209, the third optimization process is applied which includes isolating keyword. To realize step 209, a certain number of characters before and after the keyword are checked to determine whether they are both a letter and digit then no regex pattern is generated. For example, if the keyword 7052239 appears in the context 47052239A then it is very likely that this context is irrelevant, i.e., about a different category of words. Thus, this context is denied. However, in the above example, since the keyword is already isolated, applying step 209 yields /\(?:[/\,]*,){2}\d+ \w+ (\w+)\(.

At step 210, the fourth optimization process is applied: a tag detection is performed. In one exemplary embodiment of the present invention, tag value is used, such as, tag=value, or tag: value. In another exemplary embodiment of the present invention, since programmers have the habits of naming things such as tags, fields, attributes, variables so that they start with a letter, not with a digit. As such, a tag detection for characters are realized for step 210. In the example, since there is no tag, the optimization of step 210 still provides the same regex pattern: /\(?:[/\,]*,){2}\d+ \w+ (\w+)\(.

At step 211, after the optimization steps are performed to generate the new patterns, the final patterns are collected. The final pattern is collected is /\(?:[/\,]*,){2}\d+ \w+ (\w+)\(.

At step 212, determining if any seed words and seed word and seed event left? That is, every seed word and log event are paired up to go through steps 203 to 211 until the last pair is reached. Since there is only pattern, there is no pair of seed word and log event pair left.

At step 213, if there are seed words and log events left, iteratively repeat from step 203 to generate the other new patterns until the condition specified by step 212 is met.

At step 214, if the last pair of seed word and log event has reached, the generation of seed patterns stops and method 200 returns the final best regex pattern. In the illustrative example, the final regex pattern is: /\(?:[/\,]*,){2}\d+ \w+ (\w+)\(.

Figure 3:
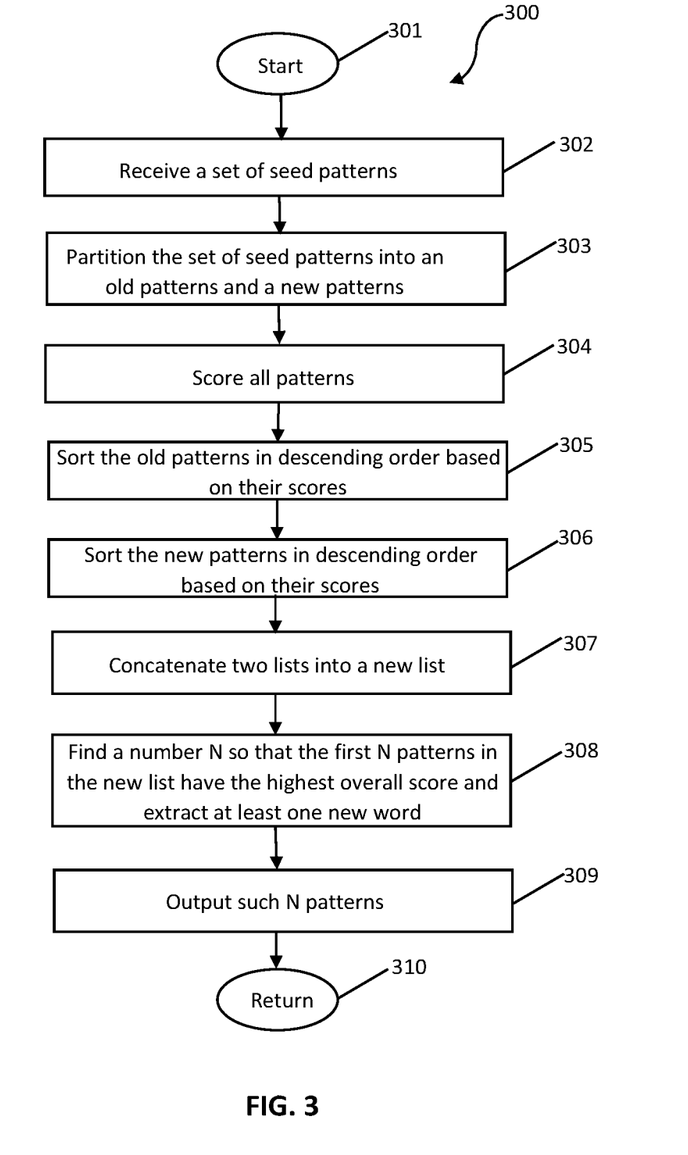
FIG. 3 is a flow chart illustrating a method of dynamic pattern selection in accordance with an exemplary embodiment of the present invention.

Now referring to FIG. 3 which shows a method 300 of dynamic pattern selection in accordance with an exemplary embodiment of the present invention. Method 300 is performed after new seed patterns are generated as described in FIG. 2 above.

At step 301, method 300 begins after new seed patterns including old patterns and new patterns are generated in accordance with the description of FIG. 2.

At step 302, a set of seed patterns is received. The set of new patterns are generated by steps 203-211 above. For example, eight seed patterns, namely, $P_1$, $P_2$, $P_3$, $P_4$, $P_5$, $P_6$, $P_7$, and $P_8$ are received. Among which, seed patterns $P_1$ and $P_2$ are old patterns and seed patterns $P_3$, $P_4$, $P_5$, $P_6$, $P_7$, and $P_8$ are new patterns.

At step 303, the set of seed patterns is partitioned into a set of old patterns and new patterns. As such, old patterns $P_1$, $P_2$; and new patterns $P_3$, $P_4$, $P_5$, $P_6$, $P_7$, and $P_8$ are separated.

At step 304, all old and new patterns are scored. In one exemplary embodiment of the present invention, the old and new patterns are scored by the following formula: score of a pattern=$R*\log_2 F$, where R stands for reliability and equals to F/N(R=F/N), where F is frequency or the number of common words between old set of seeds words and newly obtained set of seed words; and N is the size of the newly obtained set of seed words. Thus, the score of seed pattern is proportional to the frequency F. The higher the frequency F, the higher score and higher chance of being selected. The seed patterns $P_1$, $P_2$, $P_3$, $P_4$, $P_5$, $P_6$, $P_7$, and $P_8$ are scored according to the formula above.

At step 305, old seed patterns are sorted in descending order according to their scores. Thus, old seed patterns with higher scores will be arranged atop.

At step 306, new seed patterns are sorted in descending order according to their scores. Thus, new seed patterns with higher scored will be arranged atop.

At step 307, two arranged seed patterns including old and new patterns are again concatenated. This time, the final seed patterns are arranged by the descending order of scores. The following order according to calculated scores is achieved: 1. $P_1$; 2. $P_1$, $P_2$; 3. $P_1$, $P_2$, $P_3$; 4. $P_1$, $P_2$, $P_3$, $P_4$; 5. $P_1$, $P_2$, $P_3$, $P_4$, $P_5$; 6. $P_1$, $P_2$, $P_3$, $P_4$, $P_5$, $P_6$; 7. $P_1$, $P_2$, $P_3$, $P_4$, $P_5$, $P_6$, $P_7$; and 8. $P_1$, $P_2$, $P_3$, $P_4$, $P_5$, $P_6$, $P_7$, $P_8$.

At step 308, an integer N is selected so that the corresponding seed patterns have highest overall scores and at least one new word is selected. In other words, that the top N seed patterns that have the highest overall scores and at least one new word can be selected from this group are selected. As a non-limiting illustrating example, suppose the eight seed patterns $P_1$, $P_2$, $P_3$, $P_4$, $P_5$, $P_6$, $P_7$, $P_8$ arranged in the descending order of scores. That is $P_1$ has the highest overall score, $P_1$, $P_2$ has the next highest, $P_1$, $P_2$, $P_3$ have a score lower, etc. According to the non-limiting and illustrative example, the 8 patterns have the following score order:

$P_1$
$P_1$, $P_2$
$P_1$, $P_2$, $P_3$
$P_1$, $P_2$, $P_3$, $P_4$
$P_1$, $P_2$, $P_3$, $P_4$, $P_5$
$P_1$, $P_2$, $P_3$, $P_4$, $P_5$, $P_6$
$P_1$, $P_2$, $P_3$, $P_4$, $P_5$, $P_6$, $P_7$
$P_1$, $P_2$, $P_3$, $P_4$, $P_5$, $P_6$, $P_7$, $P_8$

The dynamic pattern selection of the present invention selects at least one pattern that would result in one new word. Clearly, this approach requires a relatively small number of subsets to be considered, it is exactly equal to the number of the available patterns. In many aspects of the present invention, this strategy dynamic pattern selection to distinguish with the fixed or static pattern selection. The proposed algorithm of pattern selection is formalized. Notice that, when sorting the set of all available patterns, the old (original) patterns are more prioritized than the new ones. This is needed to avoid the situation where the old patterns intended as good ones|are not selected by the algorithm just because they get lower scores. Also, step 308 does not demand every pattern in the best subset to be significant, at least one of them to have such property is required since that is enough for the subset as a whole to be significant (extracting new words). Of course, if there is no such subset, then the result is an empty set.

At step 309, N seed patterns are output.

Finally, at step 310, method 300 repeats for the next information extraction session.

In many aspects of the present invention, implementations of methods 100-300 described above achieve the following objectives:

Advancing the generation of potential regexes with further optimizations;

Improving the method of selecting the most relevant regexes which are executed as the bootstrappings progress;

Using of pattern pruning to remove irrelevant results;

Parallel processing and relation caching processes to improve computational times.

Figure 4:
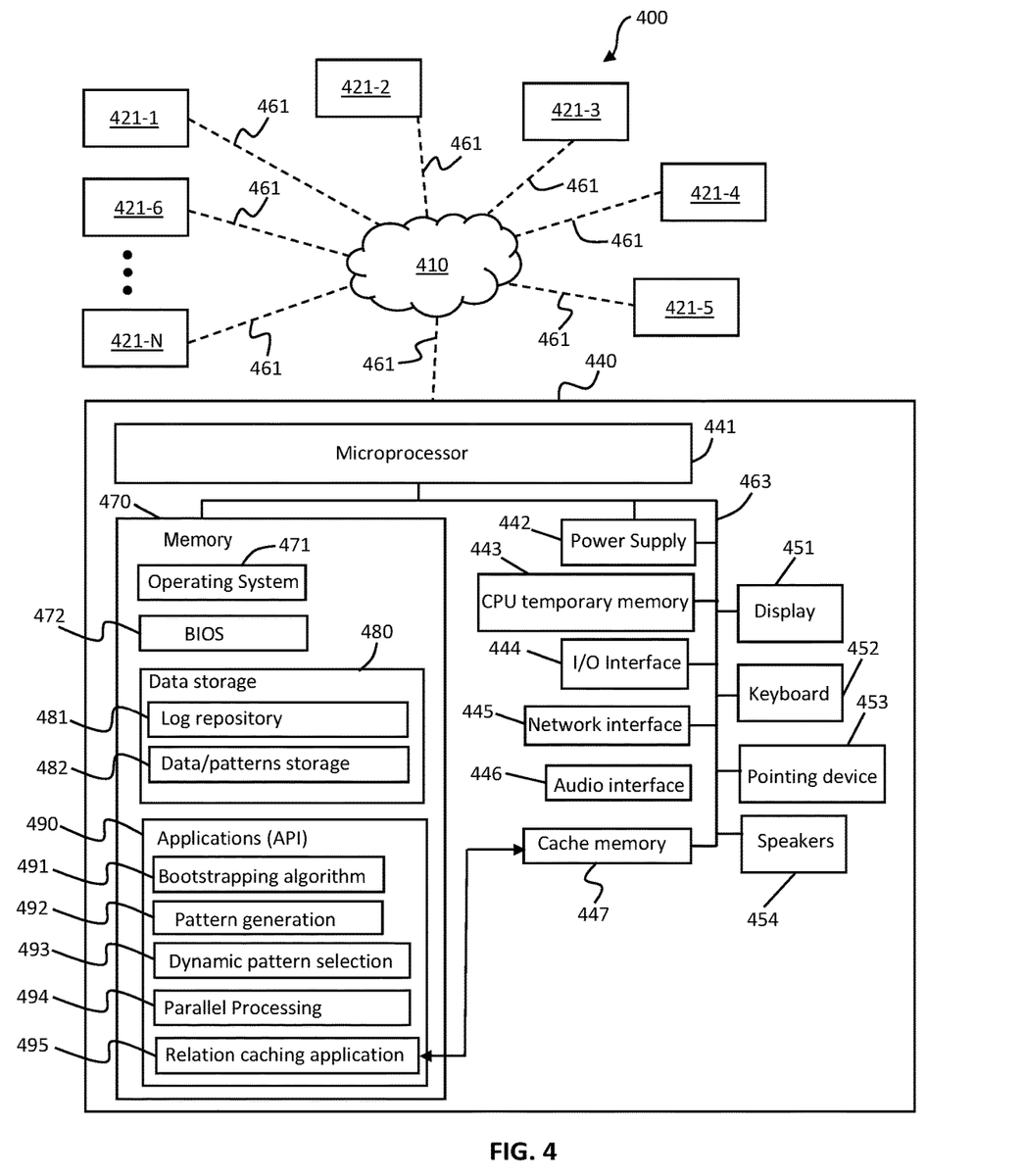
FIG. 4 is a schematic diagram of a computer system that is implemented with methods as described in FIG. 1-FIG. 3 in accordance with an exemplary embodiment of the present invention.

Now, FIG. 4 presents a schematic diagram of a cluster computing system 400 capable of parallel computing designed to implement the methods 100-300 above in accordance with an exemplary embodiment of the present invention.

Cluster computing system 400 includes a first group of independent computers 421-1 to 421-N connected together and to a high-speed network 410 via communication channels 461. In one exemplary embodiment, all independent computers 421-1 to 421-N have substantially the same structure which is shown in a representative computer 440. Representative computer 440 is used as a model to describe all structures of independent computers 421-1 to 421-N. In other embodiments, independent computers 421-1 to 421-N may have different structures. In many embodiments of the present invention, independent computers 421-1 to 421-N are clustered together by high-speed network 410 into cluster computing system 400 that has the capability of operating as one single computing resource. In other words, cluster computing system 400 forms a parallel and distributed computing environment that achieves high scalability, high throughput, and high availability. Within cluster computing system 400 in the present invention, independent computers 421-1 to 421-N cooperatively work together to create a single computer resource which explores parallelism at the job levels (such as methods 100-300 described above and 500-600 described later on) and distributing computing at a higher level. The methods described in the present invention can be performed by cluster computing system 400 using a single instruction single data (SISD), a single instruction multiple data (SIMD), multiple instructions single data (MISD), or multiple instructions multiple data (MIMD) to generate the regex patterns in accordance with the present invention.

Continuing with FIG. 4, in one exemplary embodiment, representative computer 440 includes a microprocessor 441 in communication with a memory 470 via a bus 463. Representative computer 440 also includes a power supply 442, a CPU temporary memory 443, I/O interface 444, a network interface 445, an audio interface 446, and a cache memory 447. Representative computer 440 also includes a display 451, a keyboard 452, pointing devices 453, and speakers 454. In one exemplary embodiment, power supply 442 provides power to the entire representative computer 440. In another exemplary embodiment, representative computer 440 is a super computer. Yet in another embodiment, representative computer 440 is a rack of blade servers. It will be noted that representative computer 440 can be designated as the server computer. Any independent computers 421-1 to 421-N can be deployed as a server computer for high-speed network 410.

Memory 470 may include Random Access Memory (RAM), Read-Only Memory (ROM), and/or other types of memory. Memory 470 illustrates an example of computer-readable storage media for storage of information such as computer-readable instructions, data structures, program modules or other data. Memory 470 stores a basic input/output system (BIOS) 472 for controlling low-level operation of representative computer 440. Memory 470 also stores an operating system 471 for controlling the operation of representative computer 440. It will be appreciated that operating system 471 may include a general-purpose operating system such as a version of UNIX, or LINUX™, or a specialized operating system such as Microsoft Corporation's Windows® operating system, or the Apple Corporation's IOS® operating system. Operating system 471 may include, or interface with a Java virtual machine module that enables control of hardware components and/or operating system operations via Java application programs.

Data storage 480 may further include one or more log repositories 481, which can be utilized by representative computer 440 to store, among other things, log events and data/patterns storage 482 configured to store past seed patterns or regexes, which may then be provided to other devices such as group of independent computers 421-1 to 421-N based on any of a variety of log events, including being sent as part of a request, or the like. In many embodiments of the present invention, data/patterns storage 482 include, but not limited to, permanent storage such as optical memory (CD, DVD, HD-DVD, Blue-Ray Discs), semiconductor memory (e.g., RAM, EPROM, EEPROM), and/or magnetic memory (hard-disk drive, floppy-disk drive, tape drive, MRAM) among others.

Applications 490 may include computer executable instructions which, when executed by representative computer 440, transmit, receive, and/or otherwise process messages (e.g., SMS, Multimedia Messaging Service (MMS), Instant Message (IM), email, and/or other messages), audio, video, and enable telecommunication with clients, e.g. group of independent computers 421-1 to 421-N. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 490 may include a bootstrapping application 491 configured to perform method 100 described in FIG. 1 above, a pattern generation application 492 configured to perform method 200 described in FIG. 2 above, a dynamic pattern application 493 configured to perform method 200 described in FIG. 2 above, a parallel processing application 494 which may be enabled to perform actions further described below in conjunction with FIG. 5, and a cache relation application 495 which may be enabled to perform actions further described below in conjunction with FIG. 6. In at least one of the various embodiments, while they may be illustrated here as separate applications, bootstrapping application 491, pattern generation application 492, a dynamic pattern application 493, parallel processing application 494, and a cache relation application 495 may be implemented as modules and/or components of the same application. Further, in at least one of the various embodiments, bootstrapping application 491, pattern generation application 492, a dynamic pattern application 493, parallel processing application 494, and a cache relation application 495 may be implemented as operating system extensions, modules, plugins, or the like.

Continuing with FIG. 4, in an exemplary implementation of the present invention, second group of master-slave computers 431-434 are connected together in different master-slave configurations via communication channel 462. It is noted that, non-limiting examples of communication channel 462 include short range wireless communication channels, mid range wireless communication channels, and long-range wireless communication channels. Wireless short-range communication channels include ZigBee™/IEEE 802.15.4, Bluetooth™, Z-wave, NFC, Wi-fi/802.11, cellular (e.g., GSM, GPRS, WCDMA, HSPA, and LTE, etc.), IEEE 802.15.4, IEEE 802.22, ISA100a, wireless USB, and Infrared (IR), etc. Medium range wireless communication channels in this embodiment of communication link 161 include Wi-fi and Hotspot. Long range wireless communication channels include UHF/VHF radio frequencies.

Continuing with FIG. 4, it will be appreciated that communication channel 461 may include, but not limited to, short range wireless communication channels, mid range wireless communication channels, and long-range wireless communication channels. Wireless short-range communication channels include ZigBee™/IEEE 802.15.4, Bluetooth™, Z-wave, NFC, Wi-fi/802.11, cellular (e.g., GSM, GPRS, WCDMA, HSPA, and LTE, etc.), IEEE 802.15.4, IEEE 802.22, ISA100a, wireless USB, and Infrared (IR), etc. Medium range wireless communication channels in this embodiment of communication link 161 include Wi-fi and Hotspot. Long range wireless communication channels include UHF/VHF radio frequencies.

Figure 5:
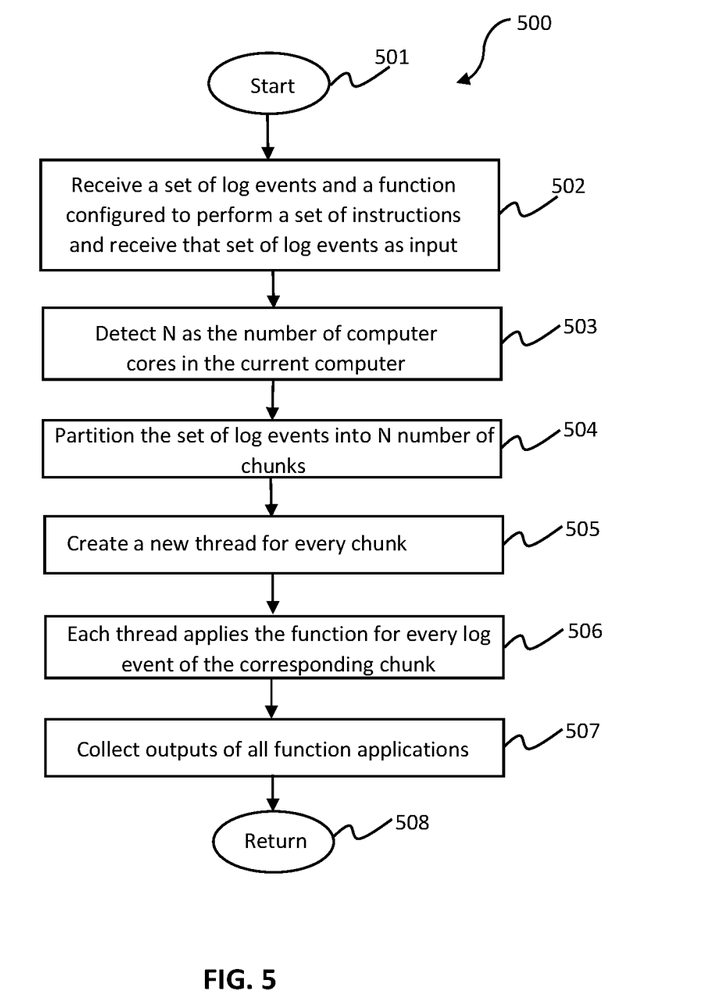
FIG. 5 is a flow chart illustrating a parallel processing of the methods described in FIG. 1-FIG. 3 in accordance with an exemplary embodiment of the present invention.

Now referring to FIG. 5, a flow chart of a method 500 for efficiently performing the methods 100-300 in accordance with an exemplary embodiment of the present invention is illustrated. In various embodiments of the present application, method 500 uses parallel operations to execute methods 100-300 by dividing the log events into smaller chunks according to the number of the CPU cores and executing the smaller chunks in parallel At step 501, method 500 begins.

At step 502, a set of log events, a pattern A, and a function f configured to work with that set of log events are received. In many implementations, the function f includes computer-implemented software program that perform methods 100-300. The function f may also include application programmable interface (API), or sub-routines, User Interface (UI), etc. In FIG. 4, bootstrapping application 491, pattern generation application 492, and dynamic pattern selection application 493 can also receive set of log events.

At step 503, number of computer cores N in the current computer is detected. In the present invention, representative computer 440 is the current computer. Representative computer 440 can be either dual core or quad core. In a non-limiting example of finding how many core CPU 441 has, go to the Start Menu (or Window Icon), right click on Computer, Properties, Advanced System Setting, Hardware, Device Manager, and Processors. There, the number of cores CPU 441 will show, e.g., Intel®core™ i5-2430M CPU@2.4 GHz. Alternatively, at the TaskBar, Task Manager, and Performance: the number of boxes is equal to the number of cores within a CPU.

At step 504, the set of log events are partitioned to N chunks equaled to the number of CPU core. If representative computer 440 is a dual core, then if the set of log events has 1,000,000 records, it is divided into 2 chunks. Chunk 1 is from 1-500,000 and chunk 2 from 500,001 to 1,000,000. If CPU 441 is a quad-core, log events are divided into four chunks. Then, 2,000,000 log events are partitioned into 4 chunks and 4 threads are created to handle the chunks:

Thread $T_1$: Log even 1 to 500,000 (chunk 1)
Thread $T_2$: Log even 500,001 to 1,000,000 (chunk 2)
Thread $T_3$: Log even 1,000,001 to 1,500,000 (chunk 3)
Thread $T_4$: Log even 1,500,001 to 2,000,000 (chunk 4)

At step 505, a thread for every chunk is created. A thread is a smallest unit of execution to which a CPU allocates time. A thread is a light weight process or a smaller task that includes a program counter, a stack, registers, and a unique ID. In the present invention, each core will perform a thread on a chunk in parallel fashion to improve processing time.

At step 506, each function is performed by a thread. That is, $T_1$ will process the function f including methods 100-300 on chunk 1 using the first core, and return the results to the first core. Similarly, $T_2$ will process the function f including methods 100-300 on chunk 2 using the second core and return the results to the second core. $T_3$ processes the function f including methods 100-300 on chunk 3, and $T_4$ processes chunk 4.

At step 507, outputs of all function applications are collected. The results of seed patterns (regexes) are collected by $T_1$—core 1, $T_2$—core 2, $T_3$—core 3, and $T_4$—core 4 which are stored in data/pattern storage 482.

At step 508, method 500 repeats for the next information extraction session.

It will be appreciated in the present invention that CPU 441 is a multi-core and multi-thread microprocessor that can perform the methods 100-400 and 500 as described in parallel operations.

Figure 6:
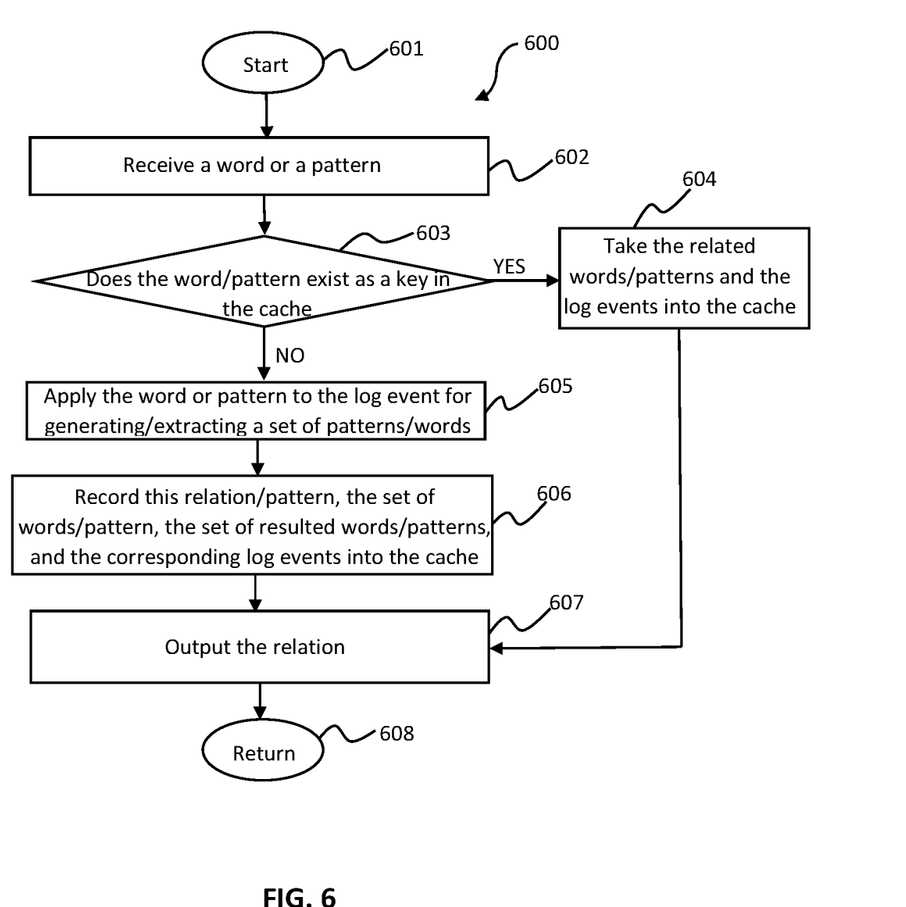
FIG. 6 is a flow chart illustrating a relation caching process for performing the methods as described in FIG. 1-FIG. 3 in accordance with an exemplary embodiment of the present invention.

Finally, referring to FIG. 6, a flow chart of a relation cache method 600 in accordance with an exemplary embodiment of the present invention is illustrated.

At step 601, method 600 begins.

At step 602, a pattern or a word is received. The following non-limiting example is provided to illustrate method 600. It will be noted that this example is merely used as an illustrating of method 600 and that it be not by anyway limit the scope of the present invention.

Continuing with step 602, assume that the current state of the pattern cache is:

Pattern $P_1$ extracts words $W_1$ at $L_1$ and $L_2$. $P_1$ also extracts word $W_2$ at $L_2$, $L_4$, and $L_5$. Pattern $P_2$ extracts words $W_2$, $W_3$, and $W_4$ at $L_3$, and $L_5$. $P_2$ also generates words $W_4$ at $L_6$.

And the current state of the word cache is:

Word $W_{10}$ generates patterns $P_{10}$ at $L_1$ and $L_2$. Word $W_{20}$ also generates $P_{20}$ at $L_{10}$ and $L_{30}$.

Word $W_{20}$ generates patterns $P_{20}$ at $L_{40}$ and $L_{50}$. Word $W_{20}$ also generates pattern $P_{30}$ at $L_{40}$ and $L_{60}$. Word $W_{20}$ generates pattern $P_{40}$ at $L_{10}$, $L_{20}$ and $L_{70}$.

At step 603, determine whether the received pattern or word has already existed in the corresponding cache. Step 603 is realized by relation cache application 495 and cache memory 447. As seen, pattern $P_1$ exists in the pattern cache but pattern $P_3$ does not. As to the relation of words, $W_{10}$ and $W_{20}$ exist in the word cache.

At step 604, if the received pattern or word has already existed, i.e., obtained from previous sessions, then retrieve the related words or patterns, and the related log events from the corresponding cache. In many aspects of the present invention, step 604 uses a look-up table (LUT) that pairs up the patterns, words, and log events together so that the next time the same pattern or word is received, method 600 goes into the LUT table to retrieve the results. In this embodiment, cache memory 447 can be a look-up table. Output the result which can be expressed as:

$P_1$ extracts $W_1$ at $L_1$, $L_2$, and $L_3$
$P_1$ extracts $W_2$ at $L_2$, $L_4$, and $L_5$.

Continuing with step 604 for word relation, the relation of $W_{10}$ is retrieved from the word cache. The retrieved relation is expressed as: $W_{10}$ generating $P_{10}$ at $L_{10}$ and $L_{30}$; $W_{10}$ generating $P_{20}$ at $L_{40}$ and $L_{50}$.

At step 605, if the received pattern or word does not exist in the corresponding cache, then apply the pattern or word to the log events. Step 605 can be realized by methods 100-300 described in details above. Applying methods 100-300 to pattern $P_3$, apply $P_3$ to all log events, assume that $P_3$ results in the extraction of $W_2$ at $L_4$.

At step 606, the resulted words or patterns and related log events are recorded into the cache memory. In practice, step 606 can be implemented by relation cache application 495 to store the results in both data storage 482 and the cache memory 447. In one embodiment of the present invention, cache memory 447 may only stores the addresses of the patterns, words, and log events in data storage 482. The fact that $P_3$ extracts $W_2$ at $L_4$ is stored into the cache memory.

At step 607, the results are output. The following word extraction is output: $P_3$ extracts $W_2$ at $L_4$. In addition, if the received input is a word, the following pattern generation are output: $W_1$ generates $P_1$ at $L_1$ and $L_3$; $W_1$ generates $P_2$ at $L_4$ and $L_5$.

At step 608, method 600 repeats for the next information extraction session. Because of relation cache method 600 of the present invention, calculation and processing time are reduced significantly. Moreover, the performance and consistency are also improved. This is especially true when relation cache method 600 is performed by parallel processing method 500 described above.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS 400 cluster computing system
410 a high-speed network
421-1 a first independent computer
421-2 a second independent computer
421-N Nth independent computer
440 representative computer
441 microprocessor or CPU
442 power supply
443 Shared memory for CPU
444 Input/Output interface
445 Network interface
446 audio interface
447 cache memory
451 display screen
452 keyboard
453 pointing device
454 speakers
461 communication link 462 master-slave connections
463 bus
470 memory
471 Operating System
472 BIOS
480 data storage
481 log repository
482 data/pattern storage
490 Applications (API)
491 bootstrapping algorithm application
492 pattern generation application
493 dynamic pattern generation application
494 parallel processing application
495 relation cache application

What is claimed is:

1. A method for generating regular expressions (regexes) as extraction patterns used by a computing system to extract specific information, comprising the steps of:
    (a) receiving log events, a set of seed words, and a set of seed patterns;
    (b) determining whether said set of seed words is full by counting whether the elements contained in said set of seed words reaches a first predetermined positive integer number;
    (c) if said set of seed words is not full, iteratively generating new patterns, selecting a subset of patterns based on pattern scores $S_1$ from said new patterns, and adding said subset of patterns into said set of seed patterns;
    (d) using word scores $S_2$ to select a subset of seed patterns from said set of seed patterns;
    (e) determining whether said subset of seed patterns is empty by counting whether the number of elements in said subset of seed patterns is zero;
    (f) if said subset of seed patterns is not empty, then applying said subset of seed patterns into said log events to extract a new set of words, selecting best words from said new subset of words based on said word scores $S_2$, and adding said best subset of words into said set of seed words; and
    (g) repeating said steps (b) to (f) until said set of seed words is full or said subset of seed words is zero, then pruning said set of seed patterns,
    wherein said subset of seed patterns is determined to be empty when said words scores $S_2$ of said seed pattern elements are all below a preset score, and
    wherein said step (f) of determining whether said set of seed patterns is full further comprises determining whether said subset of said seed patterns contains all irrelevant seed elements whose word scores $S_2$ are greater than a predetermined score.

2. The method of claim 1 wherein said first predetermined positive integer number is 50.

3. The method of claim 1 wherein said pattern scores $S_1$ is defined as $S_1 = R * \log_2 F$ wherein R equals to F divided by N (R=F/N), and wherein F is a number of common seed words between a previous set of seed words and a newly obtained set of seed words and N is the number of seed words in said newly obtained set of seed words; wherein said word scores $S_2$ are defined as $$\text{score(word)} = \frac{\sum_{i=1}^{P} \log_2(F_i + 1)}{P}$$

wherein $F_i$ is a frequency of an ith pattern and P is the number of patterns that produces said words.

4. The method of claim 1 wherein said step (c) of generating a new set of patterns further comprises:
    selecting a seed word element from said set of seed words; and
    selecting a log event that contains said seed word.

5. The method of claim 4 further comprising:
    (i) dividing said log event into a prefix section, a post-prefix section, a keyword section, and a suffix section;
    (j) generating different patterns from said prefix section, said post prefix section, said keyword section, and said suffix section; and
    (k) concatenating said different patterns into said new set of patterns.

6. The method of claim 5 wherein said step (i) of dividing said log event further comprises providing a start of string for said set of patterns.

7. The method of claim 5 wherein said step (i) of dividing said log event further comprises providing a greedy quantifier with a negated character class.

8. The method of claim 7 wherein said step (i) of dividing said log event further comprises detecting said keyword.

9. The method of claim 8 wherein said step (i) of dividing said log event further comprises a tag detection.

10. The method of claim 4 further comprising:
    repeating said step of selecting a seed word element from said set of seed words and said step of selecting a log event that contains said seed word until a last seed word and a
    log event pair.

11. The method of claim 1 wherein said step (d) of selecting a subset of seed patterns from said set of seed patterns further comprises:
    providing a score to each seed pattern element in said set of seed patterns, wherein said scores S of each seed pattern element is proportional to a number of said seed words extracted by said set of seed patterns; and
    selecting said seed pattern elements whose scores are higher than a predetermined score.

12. The method of claim 1 wherein said step (d) of generating a new set of seed patterns further comprises:
    partitioning said set of seed patterns into an old set of seed pattern and a new set of seed patterns;
    providing a score to every seed pattern element from said old set of seed pattern and said new set of seed patterns;
    sorting said old set of seed patterns and said new set of seed patterns in a descending order according to said scores into a first sorted list of old seed patterns and a second sorted list of new seed patterns;
    concatenating said first sorted list of old seed patterns and said second sorted list of new seed patterns into a combined list of sorted seed patterns; and
    finding a number N where the first N patterns of said combined list of sorted seed patterns have a highest of said score and extracting at least a new seed word from said N patterns.

13. The method of claim 1 wherein said step (g) of pruning said set of seed patterns further comprises:
    providing a score to every seed pattern element from said new set of seed patterns;
    sorting said new set of seed patterns in a descending order according to said scores into a sorted list of new seed patterns;
    concatenating said sorted list of new seed patterns into a combined list of sorted seed patterns; and finding a number N where the first N patterns of said combined list of sorted seed patterns have a highest of said score and selecting at least a new seed word from said N patterns.

14. A cluster computing system comprising:
a plurality of computers connected together through a network;
a central processing unit (CPU);
a data storage, wherein said data storage is divided into a plurality of blocks, each block comprising log events;
a software program stored in a non-transitory memory media, said software program is executed by said CPU to perform parallel operations to generate a set of extraction patterns for each of said plurality of blocks; and
storing said set of extractions patterns in a cache memory;
comparing said sets of extraction patterns from said cache memory;
if said sets of extraction patterns from said cache memory are the same then use said set of extraction patterns;
otherwise continuing performing said operations to generate said set of extractions patterns, wherein said operations to generate regular expressions (regexes) as extraction patterns in each of said log events;
(a) receiving log events, a set of seed words, and a set of seed patterns;
(b) determining whether said set of seed words is full by counting whether the elements contained in said set of seed words reaches a first predetermined positive integer number;
(c) if said set of seed words is not full, then iteratively generating new patterns, selecting a subset of patterns based on pattern scores $S_1$ from said new patterns, and adding said subset of patterns into said set of seed patterns;
(d) using word scores $S_2$ to select a subset of seed patterns from said set of seed patterns;
(e) determining whether said subset of seed patterns is empty by counting whether the number of elements in said subset of seed patterns is zero;
(f) if said subset of seed patterns is not empty, then applying said subset of seed patterns into said log events to extract a new set of words, selecting best words from said new subset of words based on said word scores $S_2$, and adding said best subset of words into said set of seed words; and
(g) repeating said steps (b) to (f) until said set of seed words is full or said subset of seed words is zero, then pruning said set of seed patterns,
wherein said subset of seed patterns is determined to be empty when said words scores $S_2$ of said seed pattern elements are all below a preset score, and
wherein said step (f) of determining whether said set of seed patterns is full further comprises determining whether said subset of said seed patterns contains all irrelevant seed elements whose word scores $S_2$ are greater than a predetermined score.

15. The cluster computing system of claim 14 wherein said step of determining whether said subset of seed patterns is empty further comprises:
providing a seed pattern score to each seed pattern element in said set of seed patterns; and
said set of seed pattern is determined to be empty when every score of said seed pattern element is below a threshold seed pattern score.

16. The cluster computing system of claim 14 wherein said step of generating a new set of patterns further comprises:
selecting a seed word element from said set of seed words;
selecting a log event that contains said seed word;
dividing said log event into a prefix section, a post-prefix section, a keyword section, and a suffix section;
generating different patterns from said prefix section, said post-prefix section, said keyword section, and said suffix section;
concatenating said different patterns into said different patterns;
dividing said log event further comprises providing a start of string for said set of seed patterns;
providing a greedy quantifier with negated character class;
detecting said keyword;
providing a tag detection to said log events; and repeating said step of selecting a seed word element from said set of seed words and said step selecting a log event that contains said seed word until a last seed word and a log event pair.

* * * * *